(12) United States Patent
Kim

(10) Patent No.: US 8,950,278 B2
(45) Date of Patent: Feb. 10, 2015

(54) LINEAR STEP MOTOR

(75) Inventor: Seho Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 283 days.

(21) Appl. No.: 13/483,798

(22) Filed: May 30, 2012

(65) Prior Publication Data

US 2013/0019704 A1 Jan. 24, 2013

(30) Foreign Application Priority Data

Jul. 22, 2011 (KR) .................... 10-2011-0072974

(51) Int. Cl.
 *F16H 25/24* (2006.01)
 *H02K 37/14* (2006.01)
 *H02K 7/06* (2006.01)

(52) U.S. Cl.
 CPC . *H02K 37/14* (2013.01); *H02K 7/06* (2013.01)
 USPC ........ 74/89.34; 74/89.37; 74/89.24; 74/89.26

(58) Field of Classification Search
 CPC ................................. H02K 37/14; H02K 7/06
 USPC ............ 74/89.34, 89.37, 89.23, 89.24, 89.26
 See application file for complete search history.

(56) References Cited

U.S. PATENT DOCUMENTS

| | | | | |
|---|---|---|---|---|
| 5,499,547 A * | 3/1996 | Nagai et al. | .................. | 74/89.34 |
| 5,784,922 A * | 7/1998 | Ozaki et al. | .................. | 74/89.37 |
| 6,116,106 A * | 9/2000 | Miyoshi | ....................... | 74/89.37 |
| 6,672,598 B1 * | 1/2004 | Engstrom et al. | ............ | 280/6.15 |
| 6,781,265 B2 * | 8/2004 | Hayashida et al. | ............. | 310/80 |
| 6,857,332 B2 * | 2/2005 | Pfister | ......................... | 74/89.34 |
| 6,882,073 B2 * | 4/2005 | Suzuki et al. | ................... | 310/80 |
| 8,047,349 B2 * | 11/2011 | Weule | ......................... | 192/84.6 |
| 8,146,991 B2 * | 4/2012 | Stanz et al. | ............... | 297/344.17 |
| 8,439,338 B2 * | 5/2013 | Taniguchi et al. | .............. | 269/55 |
| 8,567,272 B2 * | 10/2013 | Hyun | .......................... | 74/89.34 |

* cited by examiner

*Primary Examiner* — David M Fenstermacher
(74) *Attorney, Agent, or Firm* — Saliwanchik, Lloyd & Eisenschenk

(57) ABSTRACT

A linear step motor can include: a motor housing fixedly mounted at an inner surface of a ring-shaped stator and formed with an opening; a rotor rotatably mounted at a space centrally formed at the stator; a cover member coupled to a bearing to open/close the opening; a nut shaft centrally arranged at the rotor, coupled to an outside of the cover member by passing through a shaft hole centrally formed at an inner ring of the bearing, coupled at a periphery by a magnet and formed with a female screw gear-combined with a lead screw member formed at an inner surface with a male screw; and a fixing unit integrally formed with the nut shaft and fixed to the bearing coupled to the cover member.

10 Claims, 3 Drawing Sheets

LINEAR STEP MOTOR

CROSS-REFERENCE TO RELATED APPLICATION

This application claims the benefit under 35 U.S.C. §119 of Korean Patent Application No. 10-2011-0072974, filed Jul. 22, 2011, which is hereby incorporated by reference in its entirety.

BACKGROUND

1. Field of Endeavor

The present disclosure is directed to a linear step motor.

2. Background

Generally, a step motor or a stepping motor is a digital actuator rotating or linearly moving at a predetermined angle, where a motor rotating at a predetermined angle is called a step motor while a motor moving linearly at a predetermined angle is called a linear step motor.

The linear step motor is advantageous in that a rotation angle can be precisely controlled due to the number of input pulses being in proportion to a rotation angle of motor. Thus, the linear step motor is largely used for Numerical Control machine or OA (Office Automation) devices such as industrial robots, printers and/or copiers.

In general, a linear step motor structurally includes a housing, a control part mounted outside of the housing, a stator part mounted inside the housing, a rotor module rotatably mounted inside the stator part by way of electromagnetic force, and a lead screw linearly mounted in association with a rotation motion of the rotor module.

Furthermore, the rotor module includes a magnet rotatably mounted inside a tooth yoke forming the stator part at a predetermined gap, and a nut shaft rotatably mounted inside the magnet in association with the magnet and formed with female screw threads. The lead screw is formed at a periphery with male screw threads meshed with the female screw threads of the nut shaft to enable a linear movement (forward and backward movement) in response to rotation of the nut shaft.

Meanwhile, the rotor module needs a wave washer, a spacer and an E-ring about a bearing mounted at a cover member in order to fix the nut shaft on the cover member opening/closing an opening of the housing at the linear step motor. In a case a plurality of assembly parts is needed, efficiency of assembly process may deteriorate, relevant parts may be lost in the assembly process and difficulty in parts management may arise due to maintenance of a large number of parts. Another problem is that parts may be omitted in the assembly process, such that improvement on assembly process of rotor module is badly required.

BRIEF SUMMARY

The present disclosure has been made to solve the foregoing problems of the prior art and therefore an object of certain embodiments of the present invention is to provide a linear step motor configured to reduce the number of parts, to simplify an assembly process and to improve a structure of the linear step motor.

In one general aspect of the present disclosure, there is provided a linear step motor, the motor comprising: a motor housing fixedly mounted at an inner surface of a ring-shaped stator and formed with an opening; a rotor rotatably mounted at a space centrally formed at the stator; a cover member coupled to a bearing to open/close the opening; a nut shaft centrally arranged at the rotor, coupled to an outside of the cover member by passing through a shaft hole centrally formed at an inner ring of the bearing, coupled at a periphery by a magnet and formed with a female screw gear-combined with a lead screw member formed at an inner surface with a male screw; and a fixing unit integrally formed with the nut shaft and fixed to the bearing coupled to the cover member.

Preferably, but not necessarily, the fixing unit includes a plurality of hook members integrally formed at a distal end of the nut shaft, a stopper interposed between the distal end of the nut shaft and the hook member to inhibit the nut shaft from being inserted into the cover member at an abnormal coupling position; and a guide surface formed at a surface opposite to the hook members.

Preferably, but not necessarily, the hook member includes a hook body integrally formed with the nut shaft, a sliding inclination surface formed at a surface opposite to the cover member at a distal end of the hook body, and a hitching sill hooked at an inner ring of the bearing coupled to the cover member at a nut shaft fixing position of the cover member.

Preferably, but not necessarily, a pair of hook members, whose guide surfaces face each other, is protrusively formed at a distal end of the nut shaft.

Preferably, but not necessarily, each of the hook members is arranged at a 90° interval at an upper circumference of nut shaft, such that a total of two pairs are protrusively formed at a distal end of the nut shaft.

Preferably, but not necessarily, a distance from the stopper to the hitching sill corresponds to thickness of the bearing.

Preferably, but not necessarily, the guide surface has an arc having a shape corresponding to an imaginary circle having as a diameter a distance from the guide surface formed at the facing hook member.

Preferably, but not necessarily, the nut shaft is formed at some sections of inner surface with female screws.

Preferably, but not necessarily, the nut shaft is integrally formed with the fixing unit by way of molding process.

Preferably, but not necessarily, the motor housing includes a first housing formed with the stator and having an opening having a size corresponding to the stator, and a second housing coupled to an upper side of the first housing and having an upper opening having a size corresponding to a diameter of the rotor.

The linear step motor according to the present disclosure has an advantageous effect in that an assembly process can be simplified and reduction in manufacturing cost can be expected because a nut shaft is directly coupled to a cover member free from coupling parts such as a wave washer, a spacer and an E-ring.

Another advantage is that product defect caused by missing parts during assembly process can be inhibited, because no separate parts are needed for the assembly process.

BRIEF DESCRIPTION OF THE DRAWINGS

The drawing figures depict one or more implementations in accord with the present concepts, by way of example only, not by way of limitations. In the figures, like reference numerals refer to the same or similar elements.

The accompanying drawings, which are included to provide a further understanding of the disclosure and are incorporated in and constitute a part of this application, also illustrate embodiment(s) of the disclosure, and together with the description serve to explain the principle of the disclosure. In the drawings.

DETAILED DESCRIPTION

Figure 1:
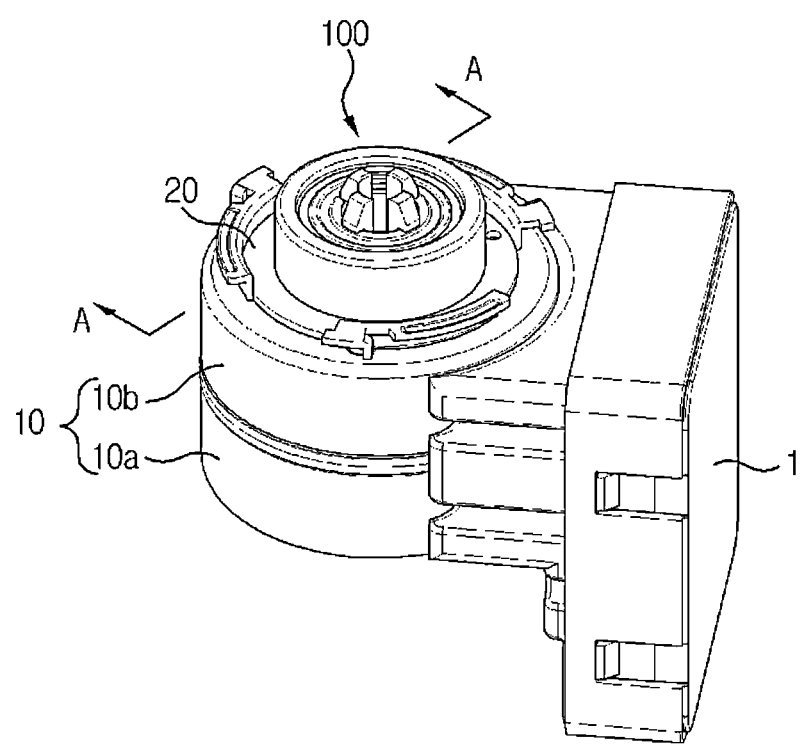
FIG. 1 is a perspective view illustrating a linear step motor according to the present disclosure.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first", "second", and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a linear step motor according to exemplary embodiments of the present disclosure will be described in detail with reference to the accompanying drawings.

Figure 2:
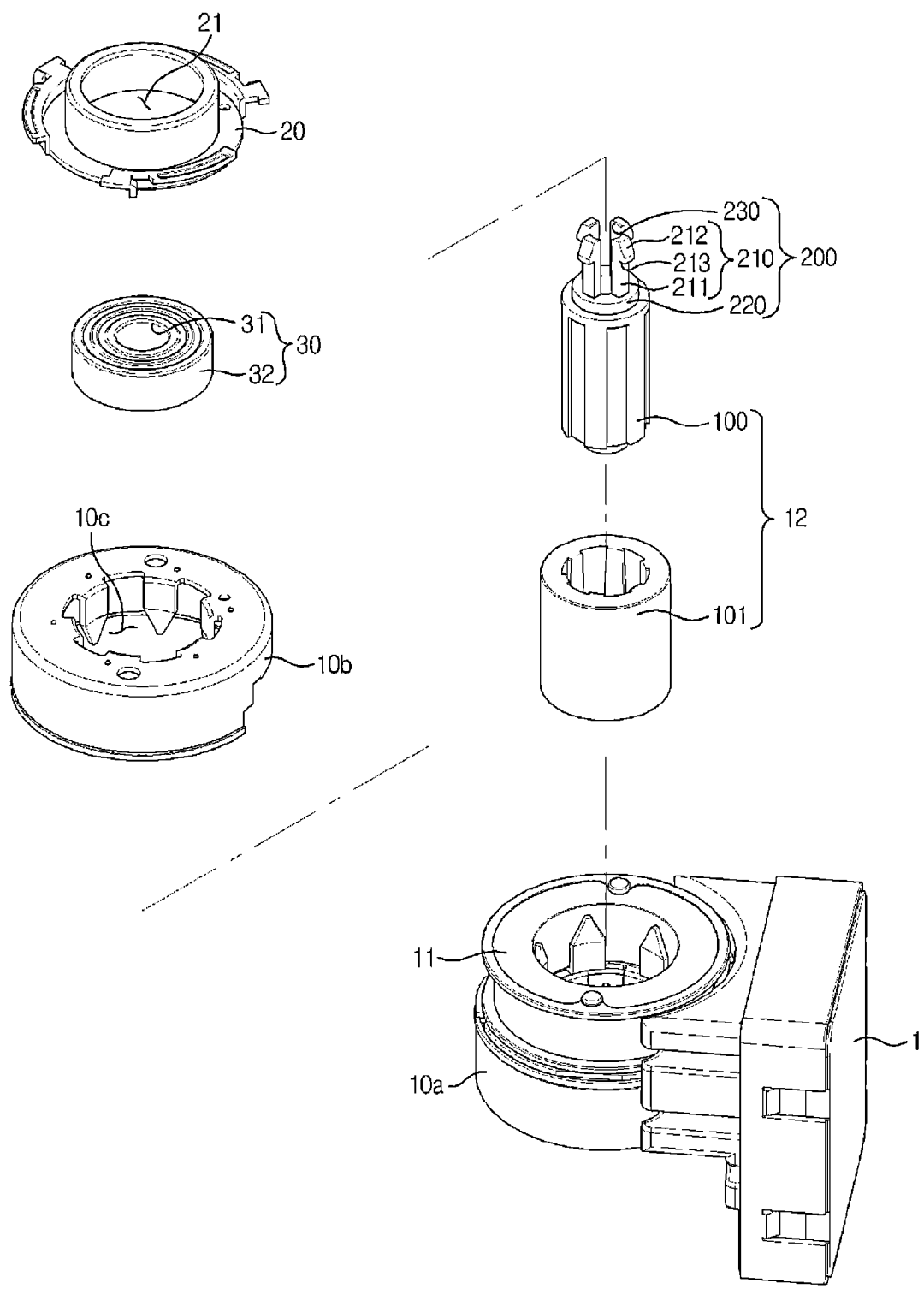
FIG. 2 is an exploded perspective view illustrating the linear step motor of FIG. 1.
Figure 3:
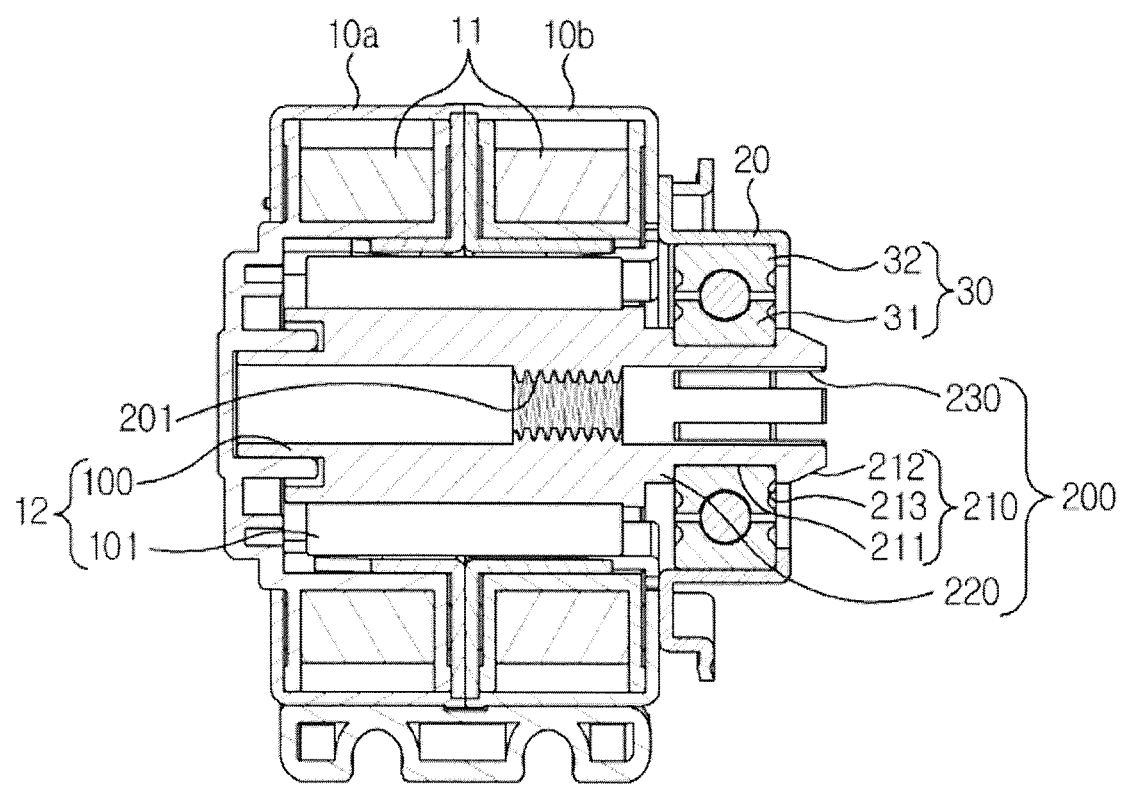
FIG. 3 is a cross-sectional view taken along line "A-A" of FIG. 1.

FIG. 1 is a perspective view illustrating a linear step motor according an exemplary embodiment of the present disclosure, FIG. 2 is an exploded perspective view illustrating the linear step motor of FIG. 1, and FIG. 3 is a cross-sectional view taken along line "A-A" of FIG. 1.

Referring to FIGS. 1, 2 and 3, a linear step motor according to an exemplary embodiment of the present disclosure includes a motor housing 10, a rotor 12, a cover member 20 and a bearing 30.

The motor housing 10 includes first and second housings 10a, 10b.

The first housing 10a, as illustrated in FIG. 1, is provided in an upper-opened cylindrical shape, and is mounted therein with a stator 11. The stator 11 is provided in an approximately ring shape, and the rotor 12 is rotatably supported in a cylindrical space formed in a center of the stator 11. Two stators 11 are generally mounted, that is, one stator 11 is mounted at the first housing 10a side while the other stator 11 is mounted at the second housing 10b side.

At this time, each of the two stators 11 has a same size and shape, and vertically (one in up and the other down) and symmetrically mounted, such that a diameter of a surface opposite to the first housing 10a of the second housing 10b corresponds to that of the first housing 10a.

The second housing 10b is fixedly coupled to an upper side of the first housing 10a, where the first and second housings 10a, 10b are generally coupled and fixed by welding, for example. That is, a surface opposite to the first housing 10a of the second housing 10b is formed with a circular opening corresponding to that of the first housing 10a, and the other surface of the opening of the second housing 10b is formed with an upper opening having a diameter corresponding to that of the rotor 12.

Meanwhile, one lateral surface of the motor housing 10 formed by coupling of the first and second housings 10a, 10b is fixedly formed with a control module 1, where the control module 1 functions to intermittently supply a power to the stator 11 to control an operation of the step motor.

The rotor 12 is rotatably mounted at a cylindrical space formed in a center of the stator 11, and includes a nut shaft 100 and a magnet 101.

The nut shaft 100, as shown in FIGS. 2 and 3, is provided in an approximately cylindrical shape, formed therein with a female screw 210 at some sections of the inner surface, and formed in a gear-combineable manner with a male screw of a lead screw (not shown). The nut shaft 100 is formed at a periphery with a plurality of lugs for inhibiting the magnet 101 from idly rotating at the nut shaft, and may be formed with a stopper in the plurality of lugs for restricting a fixed position of the magnet 101.

The magnet 101 in a cylindrical shape is coupled to a periphery of the nut shaft 100. At this time, the magnet 101 is centrally formed with a through hole having a diameter corresponding to the periphery of the nut shaft 100, and the nut shaft 100 is insertedly and vertically coupled through the through hole. At this time, it is preferable that a lug accommodation groove complementarily formed with the lug be formed at an inner surface of the through hole of the magnet 100. The cover member 20 is fixedly coupled to an upper side of the second housing 10b, formed with a diameter corresponding to that of an outer ring 32 of the bearing 30, and centrally and protrusively formed with a bearing accommodation unit 21 insertedly coupled by the bearing 30 from a down side to an upper side. Preferably, the bearing accommodation unit 21, as shown in FIG. 2, is protrusively formed toward an upper side as much as a height corresponding to that of the bearing 30.

Meanwhile, the nut shaft 100 is coupled in a hooking manner to an inner ring 31 of the bearing 30 coupled to the cover member 20 using a fixing unit 200, where the fixing unit 200 includes a hook member 210, a stopper 220 and a guide surface 230.

The hook member 210 is integrally formed at a distal end of the nut shaft 100, and includes a hook body 211, a sliding inclination surface 212 and a hitching sill 213.

The hook body 211 is integrally formed with the nut shaft 100, and extended from a distal end of the nut shaft as much as a predetermined length. The sliding inclination surface 212 is formed at a surface opposite to the cover member 20 at a distal end of the hook body 211, and so formed as to cause generation of sliding relative to an insertion direction of the hook member 210. The hitching sill 213 is provided at an area where the sliding inclination surface 212 ends, and surface-contacts the inner ring 31 of the bearing 30 coupled to the cover member 20 at a fixed position of the nut shaft 100 of the cover member 20, where the hook member 210 may be hooked to the inner ring 31 of the bearing 30.

Meanwhile, a pair of hook members 210 is preferably and protrusively formed at a distal end of the nut shaft 100 each oppositely in parallel with the guide surface 230, and according to an exemplary embodiment of the present disclosure, preferably, each of the hook members 210 is arranged at a 90° interval at an upper circumference of nut shaft 100, such that a total of two pairs are protrusively formed at a distal end of the nut shaft.

The stopper 220 that is defined by a distal end of the nut shaft 100 is provided in between the nut shaft 100 and the hook body 211 of the hook member 210. The stopper 220 is exposed to an upper side of an upper opening 10c of the second housing 10b when the rotor 12 is centrally coupled to the stator 11 and the second housing 10b is coupled.

The stopper 220 is provided to allow the hook member 210 to pass through the through hole centrally formed at the inner ring 31 of the bearing 30, and to allow the hitching sill 213 to maintain a surface contact with the inner ring 31. Thus, the stopper 220 surface-contacts a surface opposite to a surface surface-contacting the hitching sill 213 of the inner ring 31.

Thus, each of the both sides of the inner ring 31 surface-contacts the stopper 220 and the hitching sill 213 to allow the nut shaft 100 to be fixedly coupled to a cover member 20 side fixedly coupled by the bearing 30. At this time, a distance from the stopper 220 to the hitching sill 213 preferably corresponds to thickness of the bearing 30 in order to allow the nut shaft 100 to be fixed without any shake.

A guide surface 230 preferably has an arc having a shape corresponding to an imaginary circle having as a diameter a distance from the guide surface 230 formed at the facing hook member 210, which is to correspond a diameter of a lead screw (not shown) to a distance among the guide surfaces 230. In a case the guide surface 230 is provided in an arc, reciprocating motion of the lead screw can be guided while friction with the lead screw is minimized.

Meanwhile, the fixing unit thus configured is preferably formed in an integral form with the nut shaft 100. According to an exemplary embodiment of the present disclosure, when the nut shaft 100 is formed by a molding method, the nut shaft 100 is preferably configured with a shape of the fixing unit 200 and injection-molded together.

Now, an assembly method of a linear step motor according to the present disclosure will be described.

Referring to FIG. 2, the stator 11 is fixed inside the housing, and a control module 1 is conductively connected to the stator 11 at the lateral surface of the housing 10.

Furthermore, the rotor 12 is inserted into a cylindrical space centrally formed at the stator 11. At this time, the coupled state of the nut shaft 100 and the magnet 101 forming the rotor 12 is not inserted into the space, but the bearing-mounted cover member 20 is coupled to the upper side of the upper housing 10b, and the nut shaft 100 is inserted from a bottom side to an upper side of the second housing 10b coupled by the cover member 20. Then, the nut shaft 100 is hooked to the inner ring 31 of the bearing 30 coupled to an inner surface of the cover member 20 using the fixing unit 200 integrally formed with the distal end of the nut shaft 100.

As noted from the foregoing, if the nut shaft 100 is insertedly fixed from the bottom side to the upper side of the second housing 10b, the rotor 12 is inserted into the space centrally formed at the stator mounted at an interior of the first housing 10a, and the first and second housings 10a, 10b are welded to finish the fixing work.

Thus, the linear step motor according to the present disclosure has an industrial applicability in that an assembly process can be simplified and reduction in manufacturing cost can be expected, because the fixing unit 200 having the hook member 210 can be integrally formed at the distal end of the nut shaft 100 to allow the nut shaft 100 to be hooked to the bearing 30 coupled to the cover member 20, and coupling parts such as spring washers, spacers and E-rings can be removed to reduce manufacturing cost resultant from reduced number of parts.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A linear step motor, the motor comprising:
   a motor housing fixedly mounted at an inner surface of a ring-shaped stator and formed with an opening;
   a rotor rotatably mounted at a space centrally formed at the stator;
   a cover member coupled to a bearing to open/close the opening;
   a nut shaft centrally arranged at the rotor, coupled to an outside of the cover member by passing through a shaft hole centrally formed at an inner ring of the bearing, coupled at a periphery by a magnet and formed with a female screw at an inner surface to be joined to a male screw of a lead screw member; and
   a fixing unit integrally formed with the nut shaft and fixed to the bearing coupled to the cover member.

2. The linear step motor of claim 1, wherein the fixing unit includes a plurality of hook members integrally formed at a distal end of the nut shaft, a stopper interposed between the distal end of the nut shaft and the hook member to inhibit the nut shaft from being inserted into the cover member at an abnormal coupling position; and a guide surface formed at a surface opposite to the hook members.

3. The linear step motor of claim 2, wherein the hook member includes a hook body integrally formed with the nut shaft, a sliding inclination surface formed at a surface opposite to the cover member at a distal end of the hook body, and a hitching sill hooked at an inner ring of the bearing coupled to the cover member at a nut shaft fixing position of the cover member.

4. The linear step motor of claim 3, wherein a pair of hook members, whose guide surfaces face each other, are protrusively formed at a distal end of the nut shaft.

5. The linear step motor of claim 4, wherein each of the hook members is arranged at a 90° interval at an upper circumference of the nut shaft, such that a total of two pairs are protrusively formed at a distal end of the nut shaft.

6. The linear step motor of claim 5, wherein a distance from the stopper to the hitching sill corresponds to a thickness of the bearing.

7. The linear step motor of claim 6, wherein the guide surface has an arc having a shape corresponding to an imaginary circle having as a diameter a distance from the guide surface formed at the facing hook member.

8. The linear step motor of claim 1, wherein the nut shaft is formed at a part of the inner surface with female screws.

9. The linear step motor of claim 1, wherein the nut shaft is integrally formed with the fixing unit by way of a molding process.

10. The linear step motor of claim 1, wherein the motor housing includes a first housing formed with the stator and having an opening having a size corresponding to the stator, and a second housing coupled to an upper side of the first housing and having an upper opening having a size corresponding to a diameter of the rotor.

* * * * *